US012508637B1

(12) United States Patent
Kuo

(10) Patent No.: US 12,508,637 B1
(45) Date of Patent: Dec. 30, 2025

(54) COLDWORK HOLES WITH SEAMLESS SLEEVE AND UNIFORM EXPANSION

(71) Applicant: Albert S. Kuo, Chesterfield, MO (US)

(72) Inventor: Albert S. Kuo, Chesterfield, MO (US)

( * ) Notice: Subject to any disclaimer, the term of this patent is extended or adjusted under 35 U.S.C. 154(b) by 0 days.

(21) Appl. No.: 19/265,329

(22) Filed: Jul. 10, 2025

(51) Int. Cl.
*B21D 9/00* (2006.01)
*B21D 41/02* (2006.01)
*B23P 9/02* (2006.01)

(52) U.S. Cl.
CPC ............ *B21D 9/00* (2013.01); *B21D 41/02* (2013.01); *B23P 9/025* (2013.01)

(58) Field of Classification Search
CPC .......... B21D 9/00; B21D 31/04; B21D 41/02; B21D 41/026; B23P 9/025; B23P 11/005
See application file for complete search history.

(56) References Cited

U.S. PATENT DOCUMENTS

| | | | |
|---|---|---|---|
| 2,146,461 A * | 2/1939 | Bettington | F16B 19/1045 29/523 |
| 3,270,410 A | 9/1966 | Salter et al. | |
| 3,566,662 A | 3/1971 | Champoux | |
| 3,875,649 A * | 4/1975 | King, Jr. | F16B 4/004 29/523 |
| 4,164,807 A * | 8/1979 | King, Jr. | F16B 4/004 29/523 |
| 4,423,619 A * | 1/1984 | Champoux | B23P 9/025 29/446 |
| 4,557,033 A * | 12/1985 | Champoux | B23P 9/025 29/243.529 |
| 4,665,732 A | 5/1987 | Hogenhout | |
| 5,613,395 A * | 3/1997 | Zienkiewicz | C21D 7/04 72/391.2 |
| 5,943,898 A | 8/1999 | Kuo | |
| 6,266,991 B1 | 7/2001 | Kuo | |
| 7,302,746 B2 | 12/2007 | Kuo | |
| 9,744,628 B1 | 8/2017 | Kuo | |
| 10,010,983 B2 * | 7/2018 | Reid | B23P 9/025 |
| 2013/0007150 A1 | 1/2013 | Hertz et al. | |
| 2015/0016550 A1 | 1/2015 | Kim et al. | |
| 2015/0174708 A1 * | 6/2015 | Maksimov | B21D 31/04 72/392 |
| 2019/0358695 A1 * | 11/2019 | Cazabonne | B23P 9/025 |

* cited by examiner

*Primary Examiner* — Edward T Tolan
(74) *Attorney, Agent, or Firm* — Carmody MacDonald P.C.; Dennis Jm Donahue, III; Kevin C. Staed

(57) ABSTRACT

A hole-coldworking apparatus has a seamless sleeve and a mandrel which have complementary taper angles. The apparatus has a spindle assembly with a fixed section and a translating section. The fixed section is rotated by a motor and in turn rotates the translating section, the spindle, and the sleeve. The translating section is moved by an actuator to extend and retract the mandrel relative to the axially fixed section and the sleeve. The complementary tapers for the sleeve and mandrel radially expand a hole's diameter when the seamless sleeve is within the hole and the mandrel is retracted into the hole and presses against the seamless sleeve. When the mandrel is extended so that it is not in contact with the seamless sleeve, the mandrel and the seamless sleeve are rotated to assist in the insertion and the removal of the seamless sleeve in the hole.

20 Claims, 14 Drawing Sheets

Ref. US Pat 9,744,628
Data points for split sleeve and split mandrel are taken from NASA Conference Publication 3274 Part 2, 1994, Pages 1077-1086

1e)

1f)

COLDWORK HOLES WITH SEAMLESS SLEEVE AND UNIFORM EXPANSION

CROSS-REFERENCE TO RELATED APPLICATIONS

This application is an original filing of the invention as a provisional patent application and does not claim a right of priority to any other application or the benefit of an earlier filing date.

STATEMENT REGARDING FEDERALLY SPONSORED RESEARCH

Not Applicable.

APPENDIX

Not Applicable.

BACKGROUND OF THE INVENTION

Field of the Invention

The present invention relates to an apparatus and method for coldworking holes in a metal workpiece, and more particularly to coldworking holes with a seamless sleeve and mandrel having contact surfaces with complementary tapers for radial expansion of the hole.

Related Art

Currently, the most common method used in the aircraft industry to improve fatigue life of metallic structures remains the split sleeve method described in U.S. Pat. No. 3,566,662. The split mandrel method described in U.S. Pat. No. 4,665,732, which does not need a sleeve for coldworking, has also received some application. These two (2) methods employ a mandrel having a tapered major diameter portion and a minor diameter portion which is smaller than the diameter of a hole in a metallic workpiece to be coldworked. In this context, a hole means a circular hole for brevity. The mandrel is carried on the piston rod of a hydraulic cylinder. During coldworking operations, the tapered major diameter portion of a mandrel retracts through and expands a hole beyond the yield strength of material, thereby imparting beneficial compressive residual stresses around hole bore and its immediate vicinity to improve fatigue life.

A measure of the effectiveness of such methods is the "Life Improvement Factor" abbreviated herein as LIF, which is defined as the ratio between the fatigue lives of coldworked and non-coldworked holes. A measure of the degree of coldworking is the "Retained Coldwork" abbreviated herein as RCW, which is defined as the ratio between the increase in hole diameter after coldworking and the hole diameter before coldworking. Based on the principles of mechanics, one would expect that higher RCW should impart higher compressive residual stress therefore should lead to higher LIF. This is not always the case for the split sleeve and split mandrel methods. For example, the publication, "NASA Conference Publication 3274, Part 2, September 1994, Pages 1077-1086", reported that constant amplitude fatigue test results of coupon specimens coldworked by split sleeve and split mandrel methods exhibit wide data scattering in the graph of LIF versus RCW; specifically, even when RCW increases by a factor of 1.5~2.0, LIF is virtually unchanged for many of the data points; this means that increasing RCW by a factor of even 1.5~2.0 still cannot warrant a commensurate increase of LIF. Test data of the present inventor's prior invention is disclosed in U.S. Pat. No. 5,943,898 which employs seamless SMA (shape memory alloy) sleeve and exhibit similar data scattering but to a slightly less degree. The wide data scattering is a shortcoming of the prior art methods which employ a mandrel.

The present inventor's later invention is disclosed in U.S. Pat. No. 9,744,628 (the '628 Patent), hereby incorporated by reference, and employs slow mandrel retraction speed in conjunction with the present inventor's patented methods of reusable seamless sleeves to improve the effectiveness of the prior art methods as shown in FIG. 1. However, slow mandrel retraction speed increases the time duration of coldworking operation and is not appealing to the industry. Accordingly, there remains a need for coldworking holes in metal workpieces to obviate the slow mandrel retraction speed and further increase the effectiveness of coldworking.

Literature reviews of the fracture surfaces of fatigue test specimens which are coldworked with the split sleeve method, split mandrel method and the present inventor's prior inventions disclosed in U.S. Pat. Nos. 5,943,898, 6,266,991, and 7,302,746, hereby incorporated by reference, provide a clue for improving the effectiveness of coldworking. Referring to FIG. 2, the review shows that: 1) cracks often originate at the mandrel entry side of a hole 208 which is the side of hole bore at which mandrel first engages with hole bore during mandrel retraction through and out of a hole; 2) the upsetting around a hole due to coldworking is larger on the mandrel exit side of the hole 214 than that on the mandrel entry side 213, where mandrel exit side of the hole 209 is the side of a hole at which mandrel lastly engages with hole bore during mandrel retraction through and out of a hole. That cracks often originate at mandrel entry side 208 indicates that the beneficial compressive stress at the mandrel entry side 208 is smaller than that at the mandrel exit side 209. That upsetting of mandrel exit side 214 is larger than that of mandrel entry side 213 indicates that mandrel retraction speed in axial direction 212 induces plastic flow in the axial direction 212 from mandrel entry side 208 to mandrel exit side 209, abbreviated herein as "axial plastic flow", during mandrel retraction. Such axial plastic flow reduces the amount of plastic flow in the radial and tangential directions, abbreviated herein as "in-plane plastic flow", which is the primary contributor to the creation of beneficial compressive stress. Axial plastic flow is inevitable for those prior art methods employing a mandrel which always has axial speed during mandrel retraction.

In the aforementioned prior art methods which employ a mandrel, a hole is expanded in a manner called "progressive expansion" to be detailed in order. Briefly, in the progressive expansion, only a portion along the thickness of a hole is expanded at any instant of time, and the portion progressively moves during mandrel retraction from mandrel entry side of a hole 208 to the mandrel exit side of a hole 209. The propensity to incur axial plastic flow increases with increasing mandrel retraction (axial) speed. Thus, a clue to improve the effectiveness of coldworking operation is to reduce mandrel retraction speed as embodied in the '628 Patent. An alternative way to reduce axial plastic flow is to expand a hole in a manner called "uniform expansion" to be detailed in order. Briefly, in the uniform expansion, a hole is expanded at same amount at any instant of time throughout entire thickness of the hole, and the same amount of expansion is controlled by the distance of mandrel retraction.

Using the uniform expansion in conjunction with reusable seamless SMA sleeve to coldwork holes is the subject of this invention.

The difference between progressive and uniform expansion is given herein with the aid of FIG. 2 and FIG. 3, where the dimensions are exaggerated for clarity. In the progressive expansion FIG. 2, the major diameter 204 of a mandrel 201 expands a portion along thickness direction 210 of a hole 206 in a workpiece 205 beyond the yield strength of material to create a plastic zone 207 whose size is affected by the taper angle 202 of the mandrel 201. The taper angle 202 provides a transition from major diameter 204 to minor diameter 203. A smaller taper angle 202 makes a larger portion in the thickness of the hole 206 being expanded beyond yield strength of material. During mandrel retraction step of coldworking operation, the plastic zone 207 travels from mandrel entry side 208 to the mandrel exit side 209 of the hole 206. Since the plastic zone is in a fluidity state, higher mandrel retraction speed in the axial direction 212 from mandrel entry side 208 to mandrel exit side 209 would increase the propensity for the material in the plastic zone to flow toward the mandrel exit side 209, therefore making the upsetting on the mandrel exit side 214 of the coldworked hole larger than that on the mandrel entry side 213. Whereas, in the uniform expansion FIG. 3, the sleeve inner surface 311 is tapered at certain angle 313 while the sleeve outer surface 312 remains straight to mate with the straight hole surface 304 throughout the entire thickness of the hole 308 in the workpiece 303 and the mandrel 301 is also complementally tapered at same taper angle 302, namely, 302=313. Thus, during mandrel retraction in axial direction 314, the hole 304 expands same amount 315 at any instant of time throughout the entire thickness of the hole 308. When the mandrel 301 retracts beyond certain distance, the material at and near hole surface 304 become plastically yielded. At any instant of time after this moment, the continuing mandrel retraction makes the yield zone 305 grow at about same extent 315 in the radial direction of the hole surface 304 and through the entire thickness of the hole 308. As such, regardless of the mandrel retraction speed, there is less propensity for the plastically yielded material to flow toward the exit side of the hole 307 (i.e. to reduce axial plastic flow) therefore making the plastically yielded material spreading in the radial and tangential directions to increase the beneficial compressive residual stress throughout the entire thickness of the hole thus better improving the fatigue life.

The aforementioned concept of using complementary contact surfaces at an angle between mandrel surface and sleeve inner surface to effect uniform expansion along the thickness of a hole is generally disclosed in U.S. Pat. No. 3,270,410, US Pat. App. Pub. No. 2013/0071503, and US Pat. App. Pub. No. 2015/0165507. This invention improves on the general concept with a new apparatus that is tailored to the application of reusable seamless SMA sleeves to reduce coldworking operation time and improve coldworking effectiveness and is superior to the split sleeve method.

SUMMARY OF THE INVENTION

In one aspect of the invention, a seamless sleeve surrounds a portion of a mandrel's working section. The contact surfaces of the seamless sleeve and the mandrel's working section have complementary tapers for radially expanding the hole when the seamless sleeve is within the hole and the mandrel is retracted into the hole and presses against the seamless sleeve. When the mandrel is extended so that it is not in contact with the seamless sleeve, the mandrel and the seamless sleeve can also be rotated to assist in the insertion and the removal of the seamless sleeve in the hole.

In another aspect of the invention, the rotation of the seamless sleeve and the mandrel is performed by a motor through a spindle assembly that has an axially fixed section and a translating section, and the extension and retraction of the mandrel is performed by a hydraulic actuator which operates on the translating section of the spindle assembly.

In yet another aspect of the invention, a retraction control assembly is in operative communication with the mandrel assembly and the hydraulic actuator and stops the actuator from retracting the mandrel past a fully retracted position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
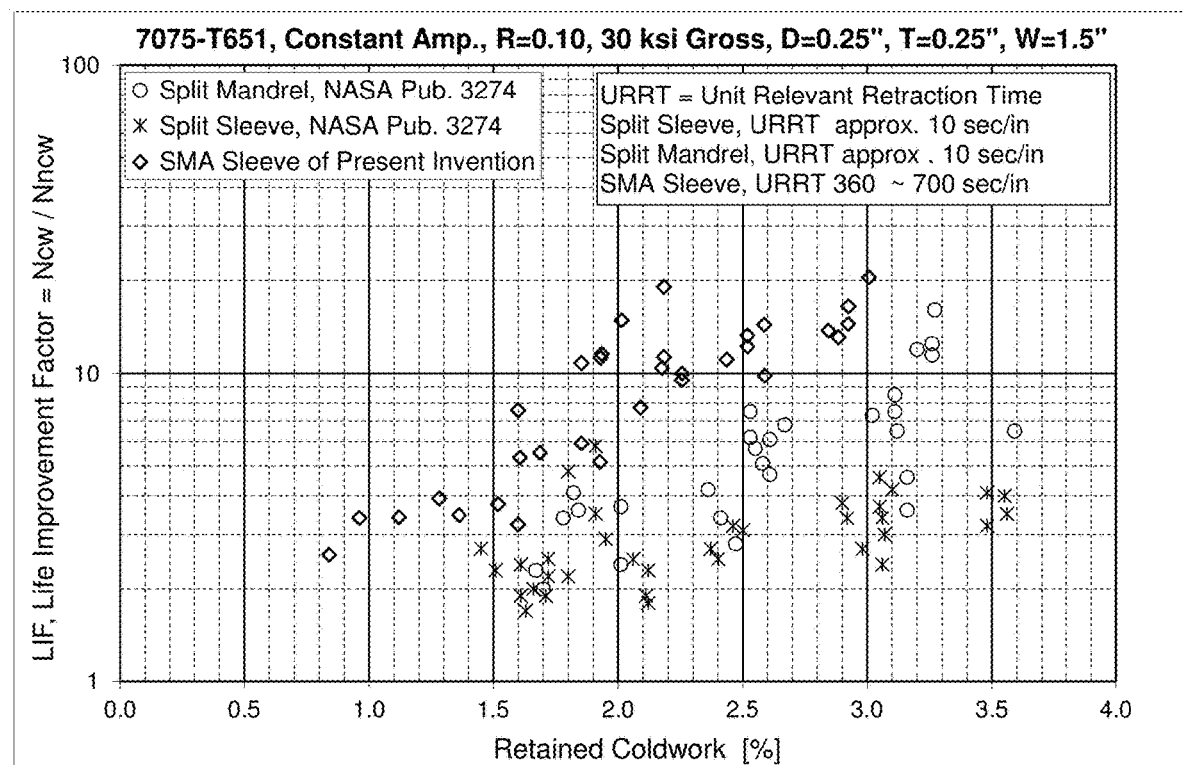
FIG. 1 shows the LIF vs. RCW of hole-coldworking for the split sleeve method, the split mandrel method, and the method disclosed in U.S. Pat. No. 9,744,628.
Figure 2:
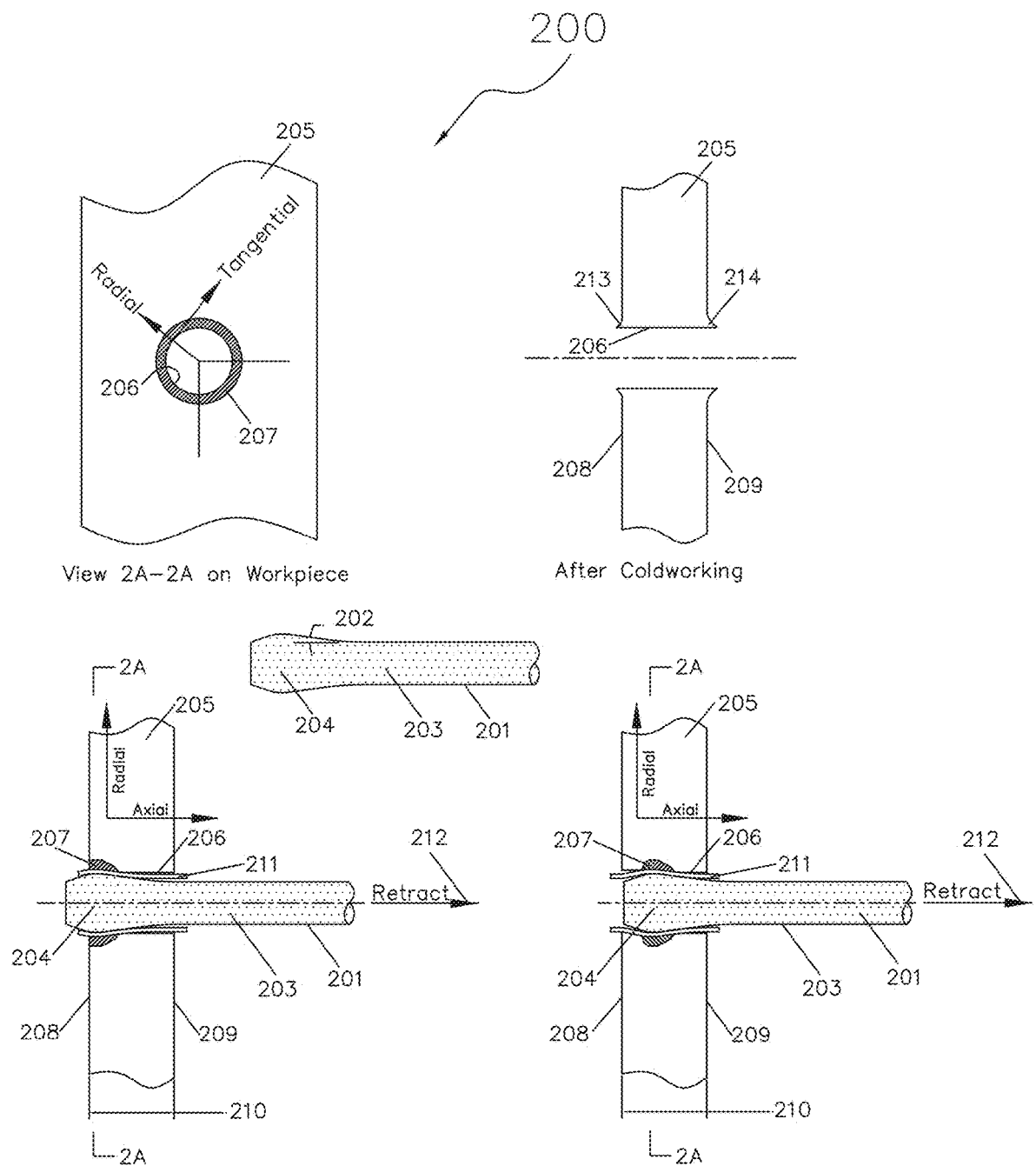
FIG. 2 generally depicts the progressive expansion of hole-coldworking of the prior art.
Figure 3:
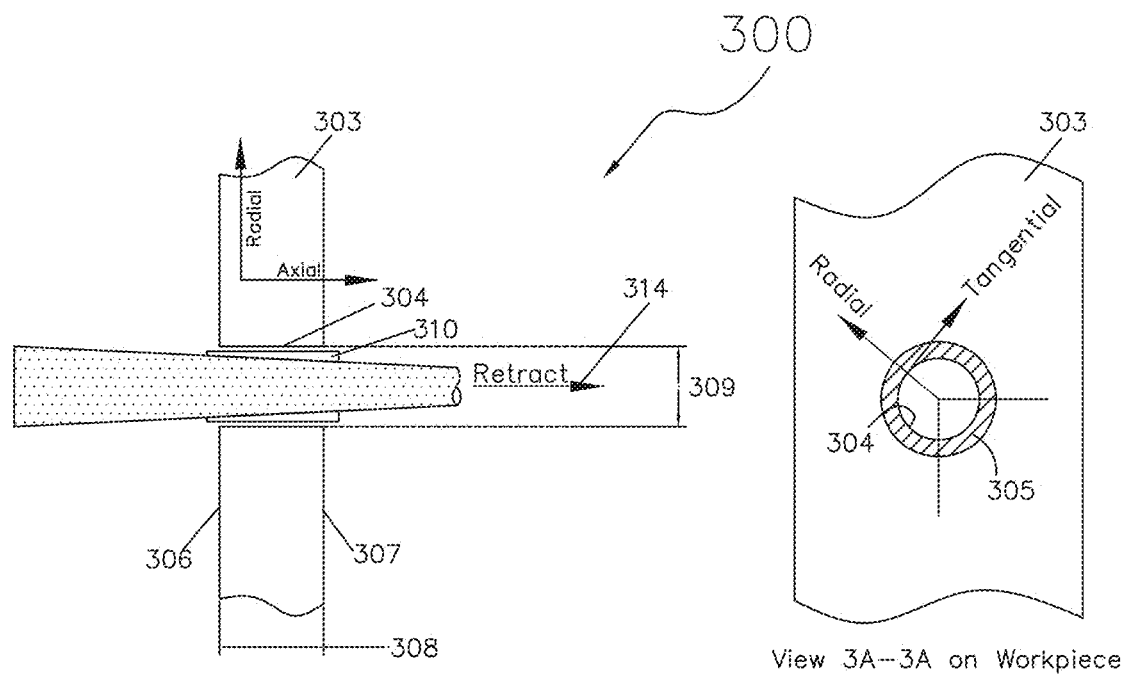
FIG. 3 depicts the uniform, radial expansion of hole-coldworking that is the subject of the present invention.
Figure 3:
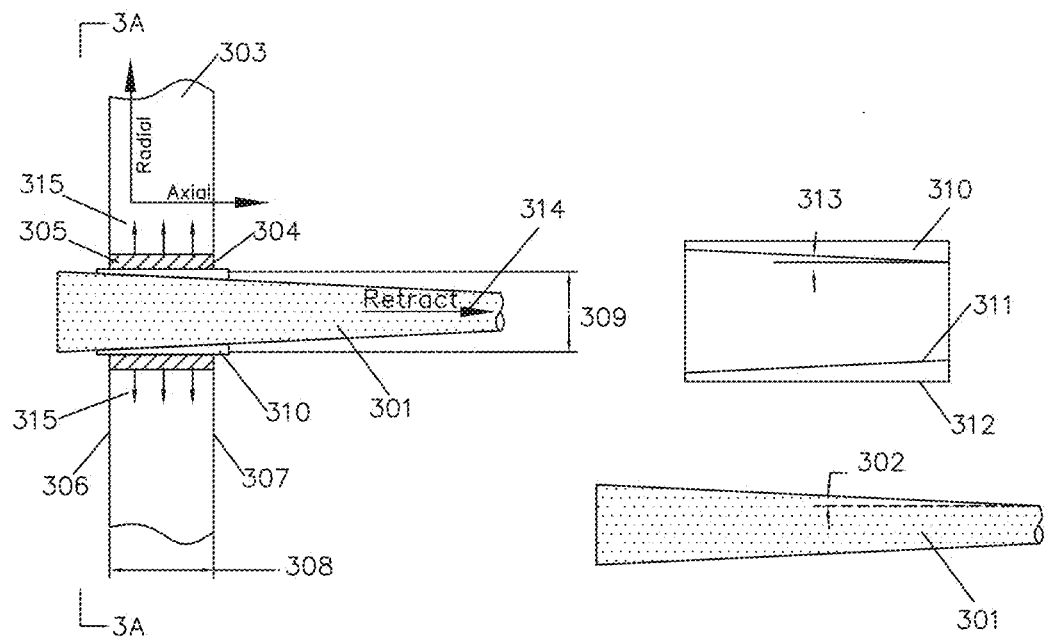

The following description of the preferred embodiment(s) is merely exemplary in nature and is in no way intended to limit the invention, its application, or uses.

The essential characteristics of the present invention as disclosed herein, particularly including the coldworking apparatus 400 and the detailed steps of operations which employ a seamless sleeve 401 and a mandrel 402, will be understood by those skilled in the art methods of coldworking holes. A cross sectional view of the coldworking apparatus of this invention is given in FIG. 4 which shows the overall assembly of parts and subassemblies that are described in detail below. Generally, the apparatus includes a spindle assembly 40 which has an axially fixed section 42 and a translating section 44. The axially fixed section is rotated by a motor 427 around a central longitudinal axis 4235 which in turn rotates the translating section, the spindle, and the sleeve. The translating section is moved by an actuator 435 to extend and retract the mandrel relative to the axially fixed section and the sleeve. The contact surfaces of the seamless sleeve and the working section of the mandrel 4021 have complementary tapers for radially expanding a diameter ($D_H$) of a hole 4341 in a workpiece 434 when the seamless sleeve is within the hole and the mandrel is retracted into the hole and presses against the seamless sleeve. When the mandrel is extended so that it is not in contact with the seamless sleeve, the mandrel and the seamless sleeve are rotated to assist in the insertion and the removal of the seamless sleeve in the hole. A retraction control assembly 436 is in operative communication with the mandrel and the actuator and stops the actuator from retracting the mandrel past a fully retracted position.

The description of specific parts and subassemblies are also provided with reference to cross sectional views given in FIGS. 5-13. The embodiment of the coldworking apparatus to effect uniform radial expansion of the hole is particularly described in four (4) sections that provide details on the specific parts and their functionality, namely, I. Sleeve & Mandrel, II. Sleeve Rotating, III. Mandrel Motion, and IV. Mandrel Retraction Distance Control. Following the description of the apparatus, the coldworking procedure using the apparatus and method of this invention is provided along with test results for the present invention relative to test results from prior art devices and methods. As explained in detail below, the apparatus is modular so that it can facilitate the change of sleeve and mandrel for different sizes of holes.

I. Sleeve & Mandrel

Figure 4:
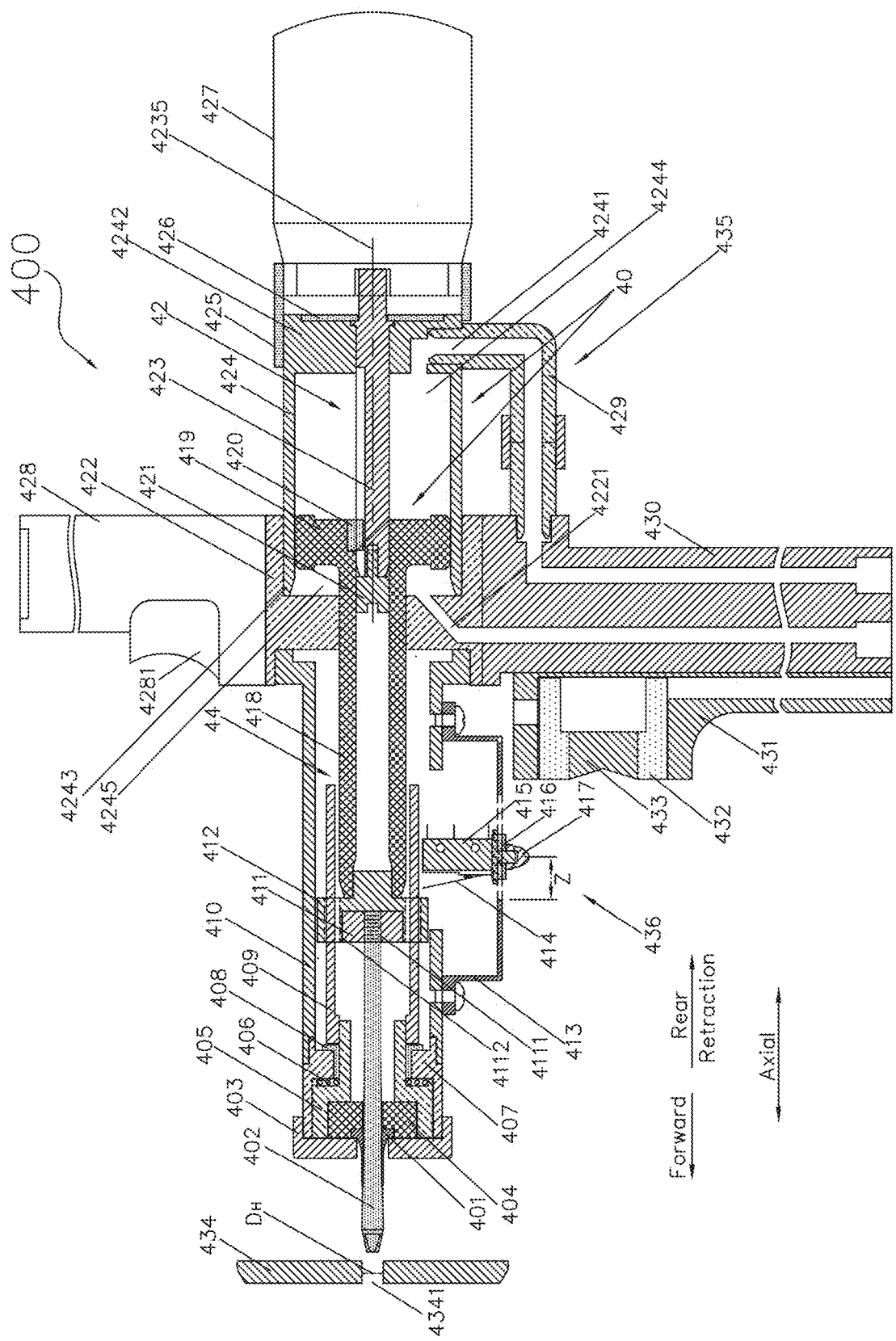
FIG. 4 shows a cross section view of the apparatus of the present invention.
Figure 5:
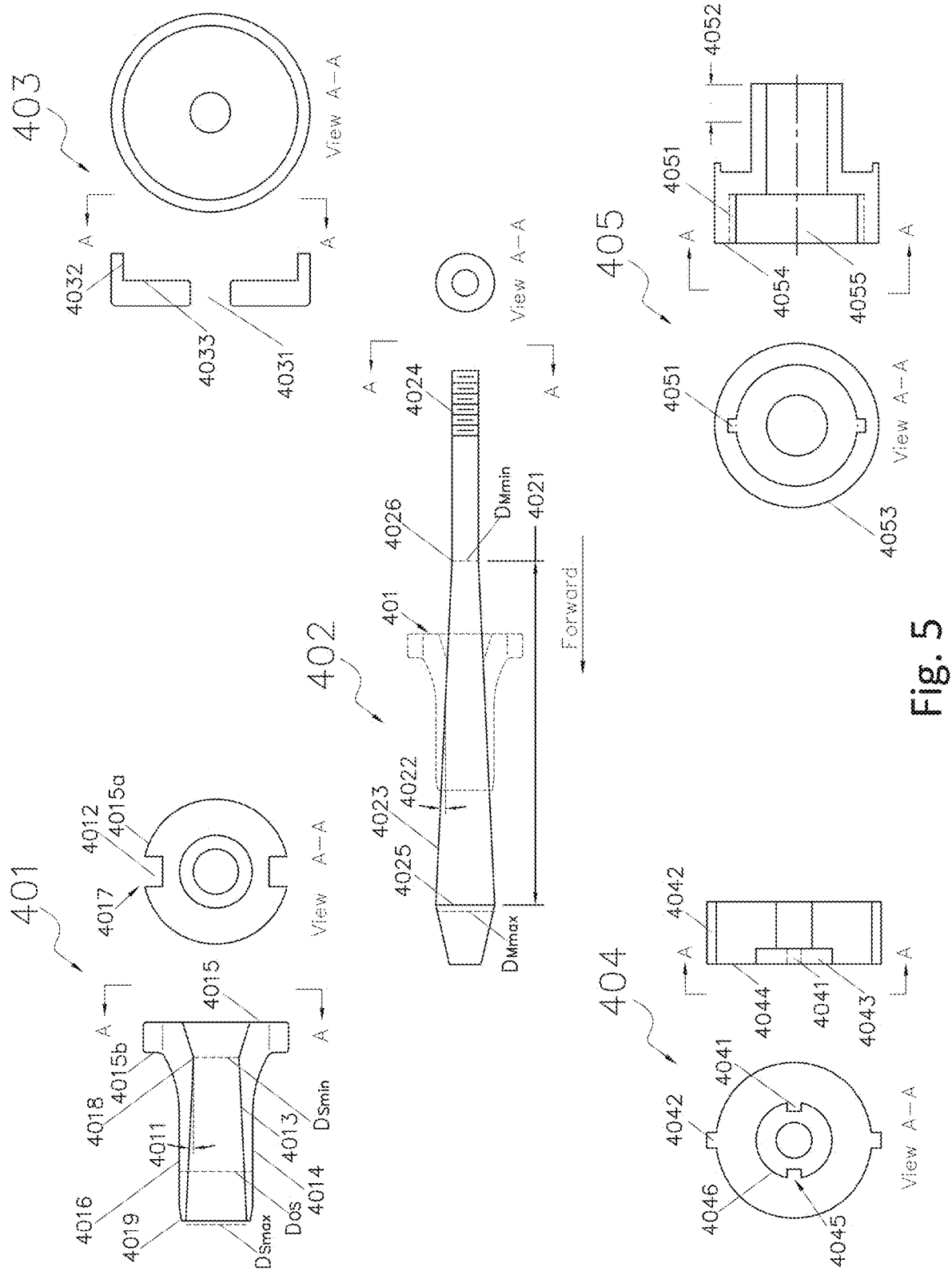
FIGS. 5-8 show cross sectional views of the parts in the apparatus of FIG. 4.

Referring to FIGS. 4 and 5, sleeve 401 is seamless and is preferably made of a shape memory alloy (SMA) which has superelasticity property. The seamless sleeve is preferred over a split sleeve because it does not create ridge and/or shear discontinuity on the coldworked hole which occurs with the split sleeve method and obviates the reaming step that is required in the split sleeve method to clean up the hole. Additionally, the superelasticity property of SMA makes the sleeve reusable which obviates the time required to change to a new sleeve for coldworking another hole. The diameters of sleeve inner and outer surfaces grow slightly from initial values to become approximately stable values due to repeated application of same sleeve to coldwork holes. The seamless sleeve 401 has a tubular section 4016 with a flange 4015 at its proximal end 4018 and which extends to a distal tube end 4019 that is placed through the hole.

Referring to FIG. 5, the seamless sleeve's inner frustoconical sidewall 4013 has a taper angle ($\phi_S$) 4011 which complements the taper angle ($\phi_M$) 4022 of the solid mandrel's working section 4021 ($\phi_S=\phi_M$). The minimum inner sidewall diameter ($D_{Smin}$) is at the proximal tube end, and the maximum inner sidewall diameter ($D_{Smax}$) is located at the distal tube end. The outer cylindrical sidewall 4014 remains straight without a taper angle which results in the proximal tube end's wall thickness ($t_{Tp}$) being greater than the distal tube end's wall thickness ($t_{Td}$), i.e., $t_{Tp}>t_{Td}$. Preferably, the taper angle ($\phi$) is between 0.4° and 4.0° for the sleeve and the mandrel. Two (2) notches 4012 are provided on the periphery 4015a of the sleeve's flange 4015 to engage with the two (2) protruding tabs 4041 on the sleeve adaptor 404 thereby preventing the relative rotation between the sleeve and sleeve adaptor, which also has another two protruding tabs 4042 to engage with the two notches 4051 on the sleeve seat 405 to prevent the rotation between sleeve adaptor and sleeve seat. It will be appreciated that the notches serve as an interlocking portion 4017 for the sleeve while the tabs serve as another interlocking portion 4045 for the sleeve adaptor and that other types of interlocking features could be used to ensure that the sleeve rotates with the sleeve adaptor and the sleeve seat. As described in more detail below, the sleeve is fixedly held in place between the sleeve adaptor and a sleeve retainer 403.

The complementary tapers of the seamless sleeve's tubular section and the mandrel's working section result in the radial expansion of the sleeve's tubular section when the mandrel retracts during coldworking operations. In particular, the solid mandrel's frustoconical exterior surface 4023 forces the sleeve's outer cylindrical sidewall 4014 to expand uniformly along the thickness of the hole 4341 in the workpiece 434 that is being coldworked as shown in FIG. 4. The maximum mandrel diameter ($D_{Mmax}$) at the distal end 4025 of the mandrel's working section is smaller than the diameter ($D_H$) of the hole 4341 in the workpiece ($D_{Mmax}<D_H$) to allow the mandrel enter and pass through the workpiece hole. To allow the seamless sleeve to slide on and off the mandrel, the minimum mandrel diameter at the proximal end 4026 of the working section is less than the minimum inner sidewall diameter ($D_{Mmin}<D_{Smin}$). The fixed rear end 4024 of the solid mandrel is provided with a screw thread to engage with the threaded bore 4111 in the mandrel bushing 411 whose outer surface 4112 engages with mandrel adaptor 412 being fastened to piston rod 418, therefore mandrel spins together with piston rod.

II. Sleeve Rotating

Figure 6:
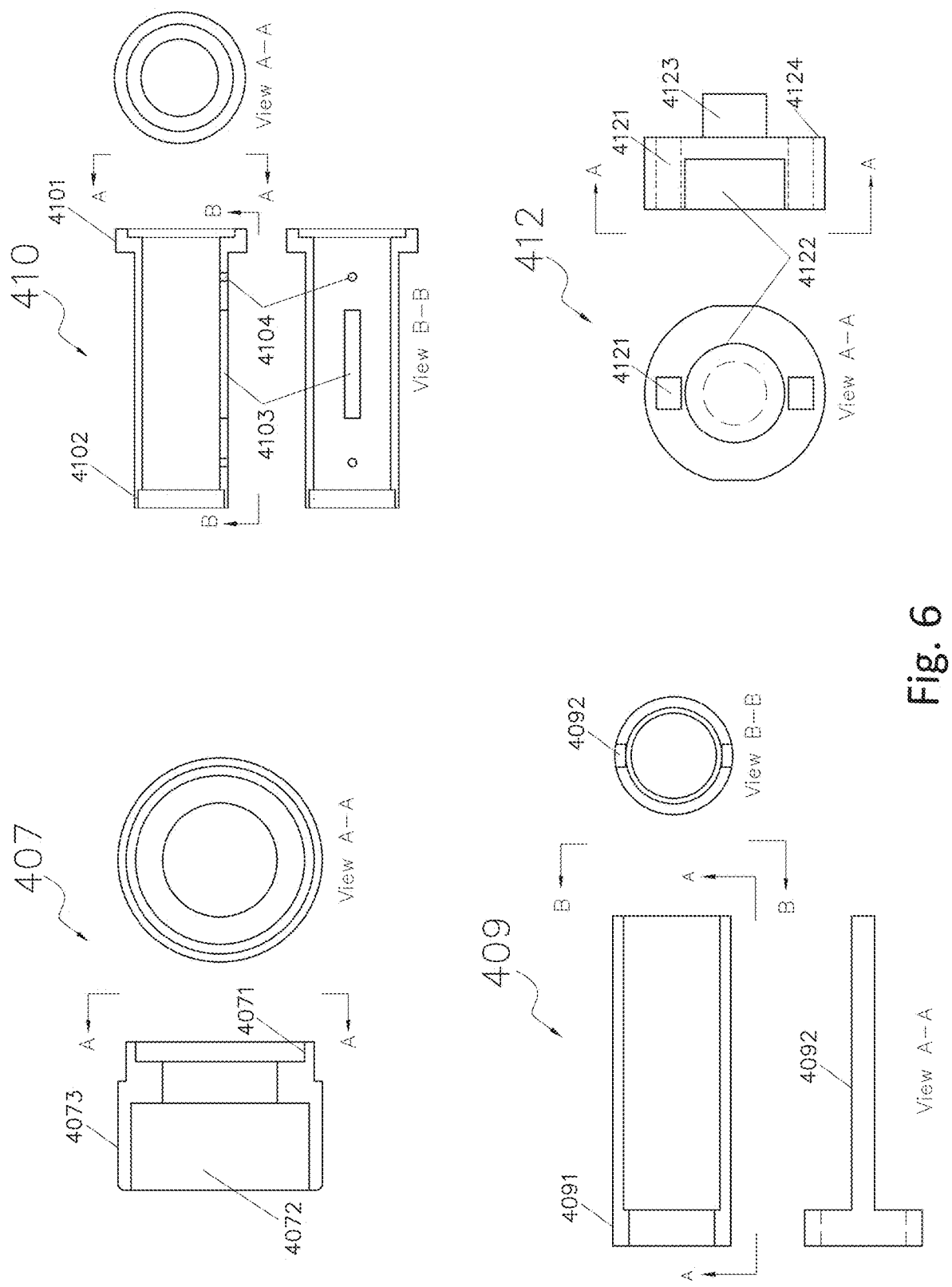

The superelasticity property of SMA makes the seamless sleeve reusable, but the outside diameter of a sleeve grows with the repeated coldworking operation with same sleeve. When the diameter ($D_{OS}$) of the sleeve's outer cylindrical sidewall 4014 becomes larger than the diameter ($D_H$) of the hole 4341, it becomes somewhat difficult to insert the seamless sleeve into the workpiece hole with bare hands. In this situation, rotating the sleeve assists the insertion of the sleeve into the workpiece hole. Rotating the seamless sleeve also assists in removing it from each of the holes after they have been coldworked because the sleeve is pressed into an interference fit with the workpiece's sidewall around the hole. Referring to FIG. 4, the rotation of sleeve involves a chain of parts in order, sleeve 401, sleeve adaptor 404, sleeve seat 405, sleeve seat spindle 409, mandrel adaptor 412, piston rod 418, piston 419, key 420, piston spindle 423, and electric motor 427. Referring to FIG. 5, sleeve adaptor 404 has a recess 4043 to house the sleeve; the dimensions of the recess are tailored to accommodate different sizes of sleeves for different sizes of workpiece holes, and the tabs 4041 extend inwardly from the recess' interior surface 4046. Sleeve seat 405 also has a recess 4055 to house sleeve adaptor 404, a screw thread portion 4052 at its rear end to engage with its matching part 4091 on the forward end of sleeve seat spindle 409. Referring to FIG. 6, sleeve seat spindle 409 has two slender tangs 4092 to pass through the two apertures 4121 on mandrel adaptor 412 with ample clearance. The mandrel adaptor 412 has a screw-threaded cavity 4122 to indirectly engage with the fixed rear end 4024 of mandrel 402 through mandrel bushing 411 and has a screw-threaded rear end 4123 to engage with a matching distal rod end 4181 on piston rod 418 which is described in further detail below with reference to FIG. 8. Mandrel bushing 411 is a short tube and is screw-threaded on both its outer surface and inner bore; the outer surface engages with the cavity 4122 on mandrel adaptor 412, whereas the diameter of its inner surface is tailored to engage with the different size of the mandrel's fixed rear end for different sizes of holes in the workpiece.

Figure 8:
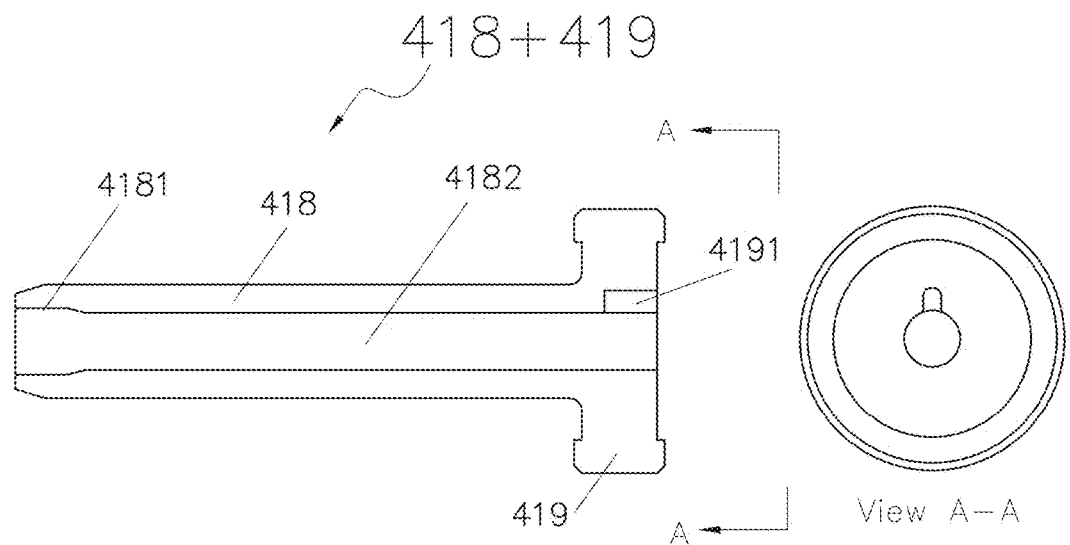
Figure 8:
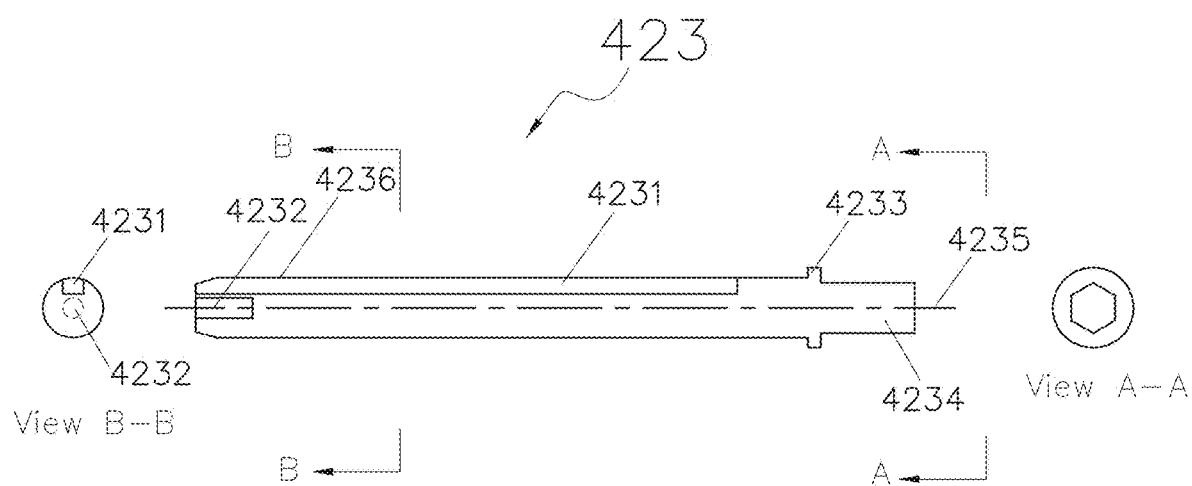

Referring to FIGS. 4 and 8, piston rod 418 and piston 419 are an integral part and has an inner channel 4182 running from end to end to allow it slide along the piston spindle 423, has a key slot 4191 to accommodate key 420 which engages with the long groove 4231 on piston spindle to effect the rotation of piston and piston rod. Piston spindle 423 has a cavity 4232 at its front end 4236 to install seal plug 421 which prevents hydraulic fluid from leaking into the forward side of the inner channel of piston rod 4182, has a flange at its rear end 4233 to prevent it from moving in forward direction, is prevented from moving in the rear direction by the rear cover 426, has a hexagonal extension at its far rear end 4234 to engage with the electric motor 427 thereby effecting the rotation of piston spindle together with the chain of parts to rotate the sleeve around a central longitudinal axis 4235. A motor handle 428 with a motor power switch button 4281 is provided to facilitate the rotation of sleeve therefore the insertion of sleeve into the workpiece's hole.

III. Mandrel Motion

The parts in the apparatus to effect mandrel motion in the axial direction include, referring to FIG. 4, a double action hydraulic actuator 424, an integral piston 419 and piston rod 418, a cylinder head 422, a rear extension tube 410, a forward extension tube 407, the sleeve retainer 403, a cylinder handle assembly 430-432 with an electrical hydraulic switch 433 to control the piston motion in forward or rear direction or hold, and a double action hydraulic power unit to energize mandrel forward and retraction. In this context the terms cylinder and actuator are used interchangeably. The rear extension tube and the forward tube together form an extension tube subassembly 407, 410. Examples of double action hydraulic power units are generally known in the art and are disclosed in the '628 Patent and US Pat. App. Pub. No. 2013/0071503 which are incorporated by reference herein. It will be appreciated that the hydraulic actuator could be replaced with an electric linear actuator. According to the apparatus of the present invention, the hydraulic power unit can retract a mandrel to coldwork a hole in about three (3) seconds for a hole of 0.25 inch thick to be commensurate with split sleeve and split mandrel methods. The hydraulic seal for the present invention includes a seal plug 421 for piston spindle 423.

Referring to FIG. 4, the double action hydraulic actuator 424 is a tubular part with an attachment 425 to the motor 427 at its rear end 4242 and an open forward end 4243 and is divided by the piston 419 into an extension chamber 4244 between the piston and the rear end and a retraction chamber 4245 between the piston and the cylinder head at the forward end. The hydraulic actuator is screw-threaded at its forward end to attach to the screw-threaded rear end of the cylinder head 422 thus forming the retraction chamber. A port 4241 at the hydraulic actuator's rear end allows hydraulic fluid to flow in and out of the extension chamber via a connecting elbow tube 429. The piston spindle 423 extends through a circular opening in the actuator's rear end, and a ring-shape recess in the rear end houses the rear cover 426 which prevents the piston spindle from moving in rear direction.

Referring to FIGS. 4-6, the cylinder head 422 also preferably has a screw-threaded forward end to attach to the rear extension tube's screw-threaded rear end 4101 and also has a channel 4221 for hydraulic fluid to flow in and out of hydraulic cylinder's retraction chamber. The cylinder head is preferably attached to both the motor handle 428 and the cylinder handle 430. The rear extension tube preferably has a screw-threaded forward end 4102 to attach to the screw-threaded rear end 4071 of the forward extension tube and has a slot 4103 for retraction controller holder 415 to pass through and slide. The rear extension tube has threaded apertures 4104 that can receive bolt threads for attaching the housing of retraction controller holder 413. The forward extension tube 407 has a cylindrically shaped cavity 4072 to house the sleeve seat 405 and the diameter of the cavity 4072 being chosen to provide a clearance between sleeve seat and the cavity for allowing free rotation of sleeve seat. The screw-threaded forward end 4073 of the forward extension tube attaches to the rearward facing rim 4032 of the sleeve retainer 403. The sleeve retainer has a center aperture 4031 through which the mandrel's working section and the sleeve's tubular section extend. The sleeve retainer's inner surface 4033 has a clearance with the forward face of sleeve flange 4015b, the forward face 4044 of the sleeve adaptor, and the forward face of sleeve seat 4054 to effect free rotation the sleeve.

The cylinder handle assembly includes a cylinder handle 430, an electrical hydraulic control switch 433, an electrical hydraulic switch holder 432, and a electrical hydraulic switch housing 431. The cylinder handle 430 includes channels for the hydraulic fluid to flow in and out of the two chambers of the cylinder 424. The electrical hydraulic control switch 433 controls the retraction and extension of the piston 419 and mandrel 402, wherein electrical hydraulic switch housing 431 being provided with a channel shape passage to accommodate electrical wires.

IV. Mandrel Retraction Distance Control

Figure 7:
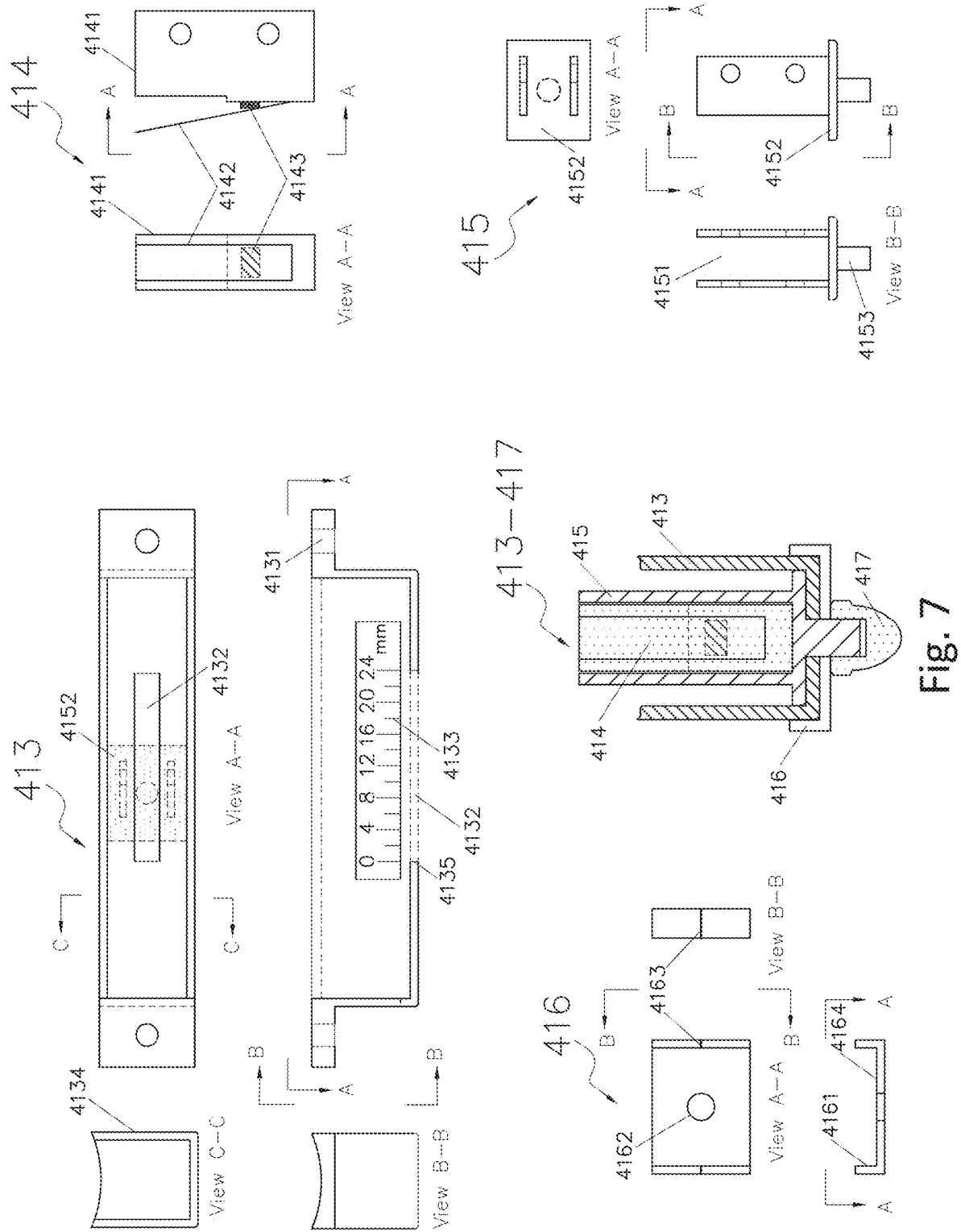

Referring particularly to FIGS. 4 and 7, the retraction control assembly 436 in the apparatus which controls the mandrel retraction distance includes an electrical stop switch 414, a switch holder 415 with an axial slide mechanism, a mandrel travel indicator 416 to exhibit mandrel retraction position, a locking nut 417 to fix switch holder 415 at a desired position for controlling the mandrel retraction distance, and a housing 413 for switch holder that allows the sliding of the switch holder 415 in the axial direction. Referring to FIGS. 6 and 7, the electrical stop switch 414 has a switch body 4141, a control button 4143, and a lever 4142 to trigger the button to stop mandrel retraction when being touched by the outer edge on the rear face of mandrel adaptor 4124.

The electrical stop switch 414 is wired to be normally closed and is in series connection with the circuit line in the electrical hydraulic switch 433 for mandrel retraction. Thus, when the lever 4142 is not triggered, mandrel retraction continues. When the lever 4142 is touched by the lower rear face 4124 of mandrel adaptor, the circuit becomes open therefore mandrel retraction stops. The switch holder 415 has a space 4151 to house the stop switch 414 and a lip 4152 that facilitates sliding within the housing 413. The switch holder also has a threaded tab 4153 that the operator can grasp to facilitate its sliding relative to the housing, and the locking nut fixing screws 417 over the threaded tab and tightens against the bottom of the housing to fix the switch at the desired location on the housing.

The mandrel retraction distance control can also include a mandrel travel indicator 416 with a plate 4164 positioned between the bottom of the housing and the locking nut. A rim 4161 on each side of the plate extends over the housing's sidewalls 4134, and the threaded tab extends through an aperture 4162. The rim preferably includes a line 4163 to collaborate with a ruler 4133 on the housing sidewall to show the mandrel retraction distance. Each end of the housing preferably includes an aperture 4131 that aligns with one of the threaded apertures in the rear extension tube 4104, and nuts are used to attach the housing to the rear extension tube. The housing has a slot 4132 through which the threaded tab extends. The ruler has a "0" mark which is aligned with the slot's forward edge 4135 and a series of distance marks which allow the operator to set the retraction distance for the mandrel according to the method described in detail below with reference to FIGS. 10 and 11.

As particularly disclosed herein, the retraction distance control uses a mechanical stop switch that is manually slid within the switch holder and locked in place with the lock nut on the threaded tab. It will be appreciated that the movement of the mechanical stop switch could be mechanized with an electronic controller, such as a microslide that moves the physical retraction distance switch to an intended position that is entered into the electronic controller. It will also be appreciated that an electronic controller could incorporate a pressure sensor and a linear displacement sensor, such as disclosed in US Pat. App. Pub. No. 2013/0071503, which would allow the operator to set the working stroke of the piston which corresponds to the working distance desired for the length of the mandrel's working section that coldworks the hole.

Coldworking Procedure & Test Results

Figure 9:
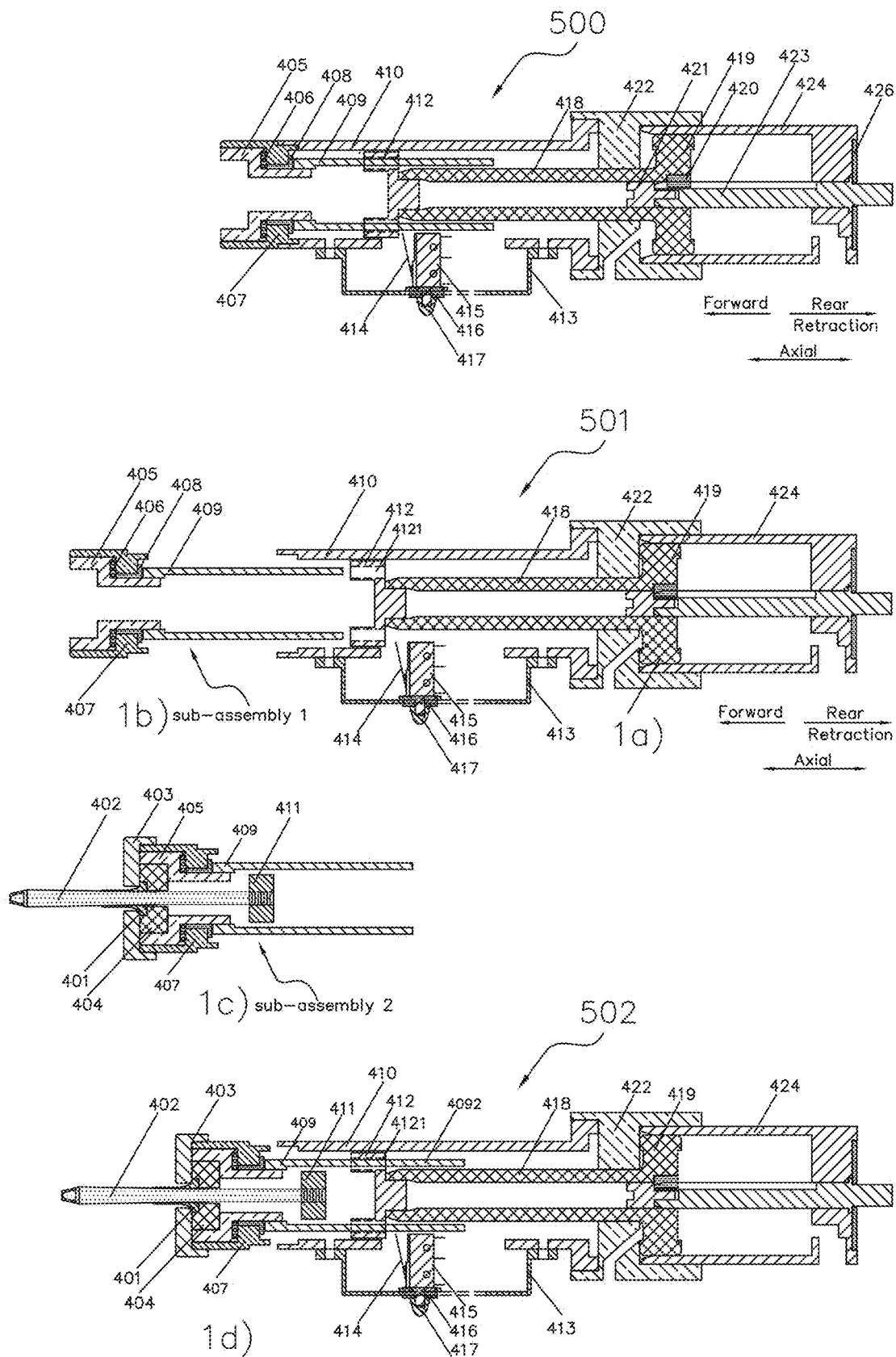
FIGS. 9-13 show the operational steps to coldwork holes with the apparatus of the present invention.
Figure 10:
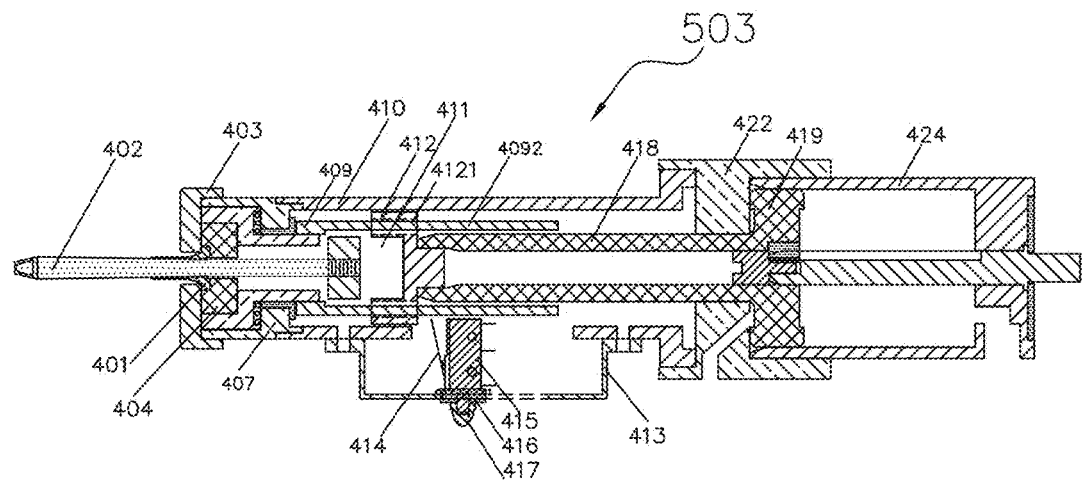
Figure 10:
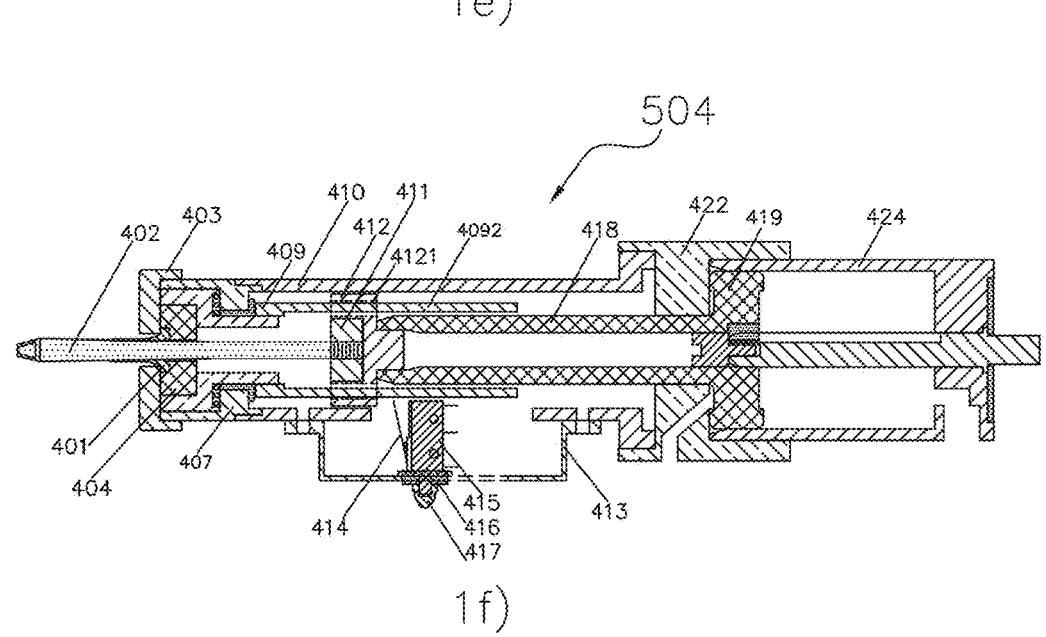
Figure 10:
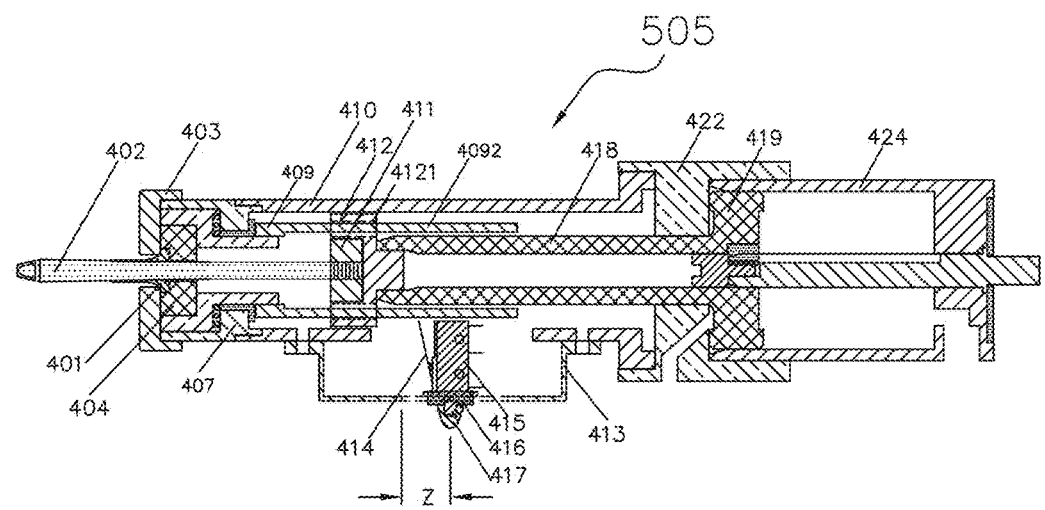

Referring to FIG. 9, the procedure starts with the main assembly 500 of the apparatus which can accommodate subassemblies that can be used for different sized holes. In particular, the main assembly allows for different sizes of mandrels and seamless sleeves to be assembled in modular pieces. Referring to FIGS. 9 and 10, Step 1 is the installation of the mandrel assembly and the seamless sleeve with the sleeve seat assembly:

Step 1a) 501 with the control switch 433 set to its extension setting, advance piston 419 to the extreme forward end of cylinder 424 till piston bottoms out.

Step 1b) 501 remove sleeve seat 405, thrust bearing 406, forward extension tube 407, sleeve bearing 408, and sleeve seat spindle 409 together as sub-assembly 1 by turning the screw-thread on the rear end of forward extension tube 4071.

Step 1c) 501 install sleeve 401, mandrel 402, sleeve adaptor 404, mandrel bushing 411 and sleeve retainer 403 in sub-assembly 1 to become sub-assembly 2.

Step 1d) 502 place sub-assembly 2 partially inside the rear extension tube 410 and pass the tang 4092 of the sleeve seat spindle 409 through the aperture 4121 of the mandrel adaptor 412.

Step 1e) 503 screw in sub-assemble 2 (except mandrel 402 and mandrel bushing 411 which are already in place) to attach to rear extension tube 410;

Step 1f) 504 push mandrel 402 and mandrel bushing 411 toward rear direction till touching mandrel adaptor 412 then screw in the mandrel bushing 411 to engage with mandrel adaptor 412.

Figure 11:
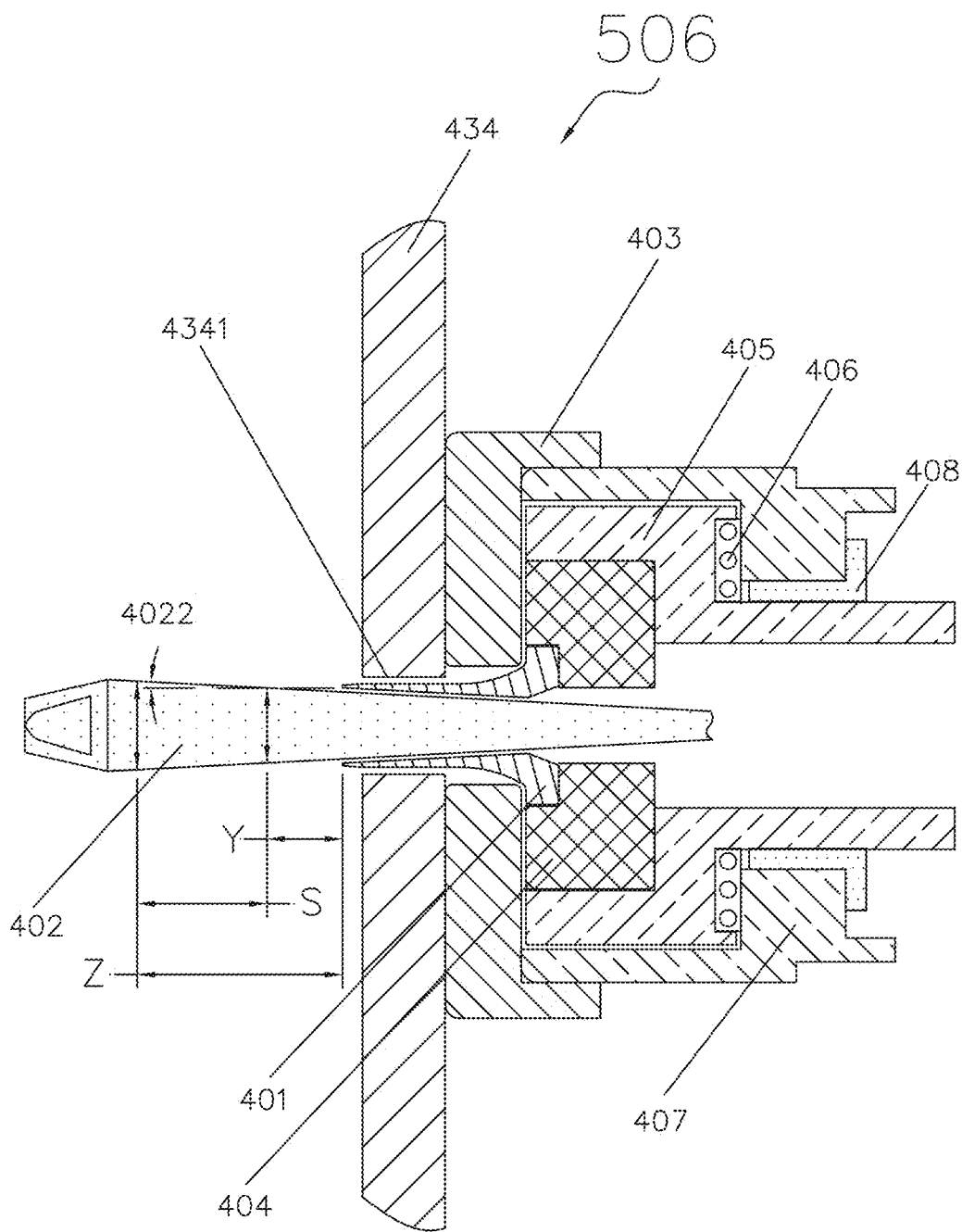

Referring to FIGS. 5, 10 and 11, Step 2 is to set mandrel retraction distance Z for a specific workpiece hole size:

Step 2a) 506 calculate $S=\Delta/\text{Tan}(\phi)$, wherein S is the effective mandrel retraction distance while the sleeve's inner frustoconical sidewall 4013 is in contact with the surface of the mandrel's working section 4021 to distinguish it from mandrel retraction distance Z, $\Delta$ is the intended radial expansion, and $\phi$ is the taper angle of the sleeve and mandrel, wherein $\Delta$ is determined by the intended coldworking interference, namely, the difference between the hole radius at maximum expansion and the radius of the workpiece hole. For example, $\Delta=6.35\times0.04/2=0.127$ mm for a workpiece hole of 6.35 mm diameter at the so-called 4% coldworking interference in the industries, and $S=0.127/\text{Tan}(2°)=3.64$ mm, assuming $\phi=2°$.

Step 2b) 506 calculate mandrel retraction distance $Z=Y+S$, wherein Y is the mandrel backlash distance being measured from the sleeve forward end surface to the location on the mandrel where mandrel diameter equals inner diameter of sleeve forward end and being devised to facilitate the installation of mandrel 402 together with mandrel bushing 411 into mandrel adaptor 412, wherein Y is approximately between 3 and 6 mm and for example $Z=3.64+4=7.64$ mm assuming Y=4 and S=3.64, wherein all dimensions in FIG. 11 are exaggerated to clarify the features of the parts.

Step 2c) 505 position the electrical switch holder 415 together with mandrel travel indicator 416 at a distance of Z from the far forward edge of the slot 4135 in the housing for retraction distance switch 413 and lock the position with locking nut 417.

Figure 12:
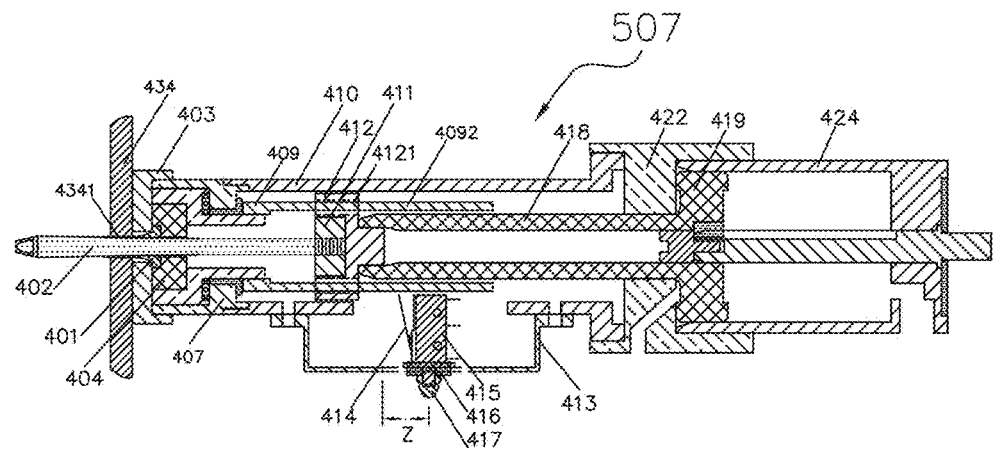
Figure 12:
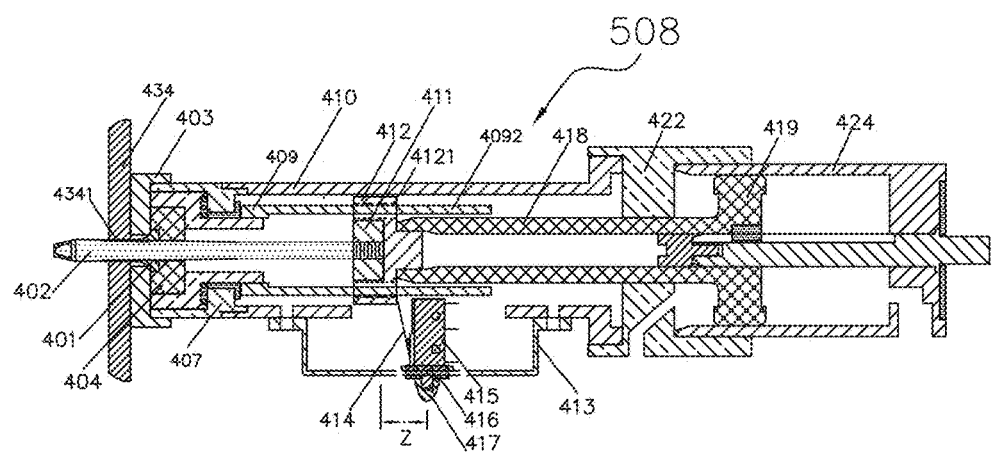
Figure 12:
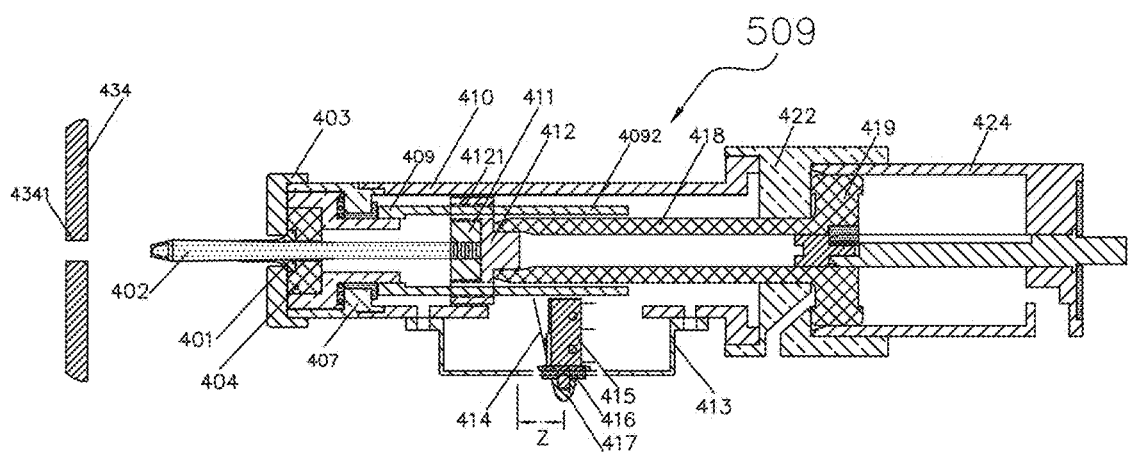

Referring to FIG. 12, Step 3 is to insert the sleeve 401 into a workpiece hole to be coldworked:

Step 3a) 507 use bare hands to push the sleeve together with the entire apparatus into the workpiece hole 4341, but switch to step 3b) when bare hands have slight difficult to do it because of the growth of sleeve diameters due to repeated application of the same sleeve, Step 3b) 507 press the motor switch button 4281 to activate the rotation of sleeve, then insert the sleeve into the workpiece hole while lightly push the rotating sleeve into the workpiece hole, deactivate the electrical motor switch to stop the rotation of the sleeve when sleeve retainer 403 is felt to touch the surface of the workpiece.

Referring to FIG. 12, Step 4 is to retract the mandrel to expand the workpiece hole:

Step 4a) with the control switch 433 set to its retraction setting, activate electrical hydraulic switch 433 to retract the mandrel 402

Step 4b) 508 when mandrel retraction reaches the intended distance Z, mandrel retraction automatically stops as the lower rear end surface of mandrel adaptor 4124 touching the tip of the electrical switch's lever 4142 to open the retraction hydraulic circuit.

Step 4c) 509 advance the piston 419 to the extreme forward end of the cylinder 424 till piston bottom out to disengage the mandrel from the sleeve, thereafter the expanded sleeve shrink owing to its property of superelasticity, then withdraw the sleeve together with the entire apparatus out of the coldworked hole with bare hands, but switch to step 4d) when bare hands have slight difficult to do it because of the growth of sleeve diameters due to repeated application of the same sleeve.

Step 4d) 509 press the motor switch button 4281 to activate the rotation of sleeve, then pull the rotating sleeve out of the coldworked hole, this step completing the procedure to coldwork a hole.

Referring to FIG. 12, Step 5 is to coldwork additional workpiece holes of same size using same sleeve and mandrel by repeating steps 3 and 4. The SMA seamless sleeve is reusable owing to its superelasticity property.

Figure 13:
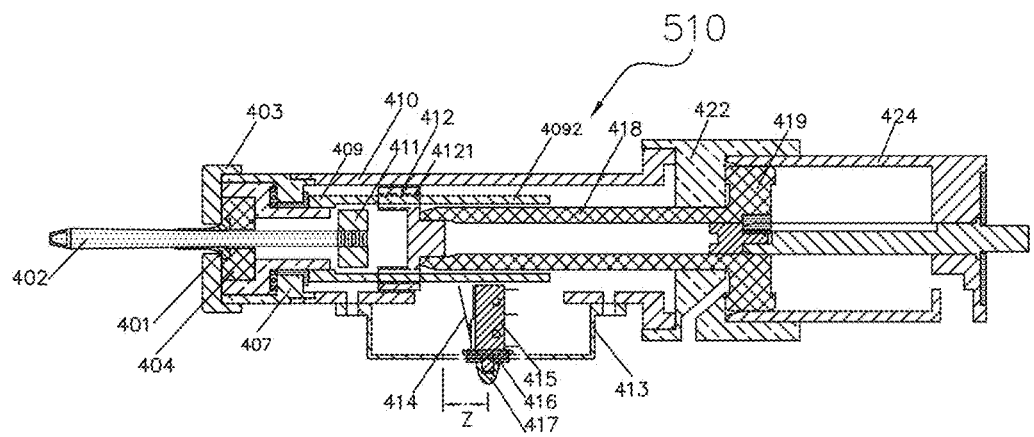
Figure 13:
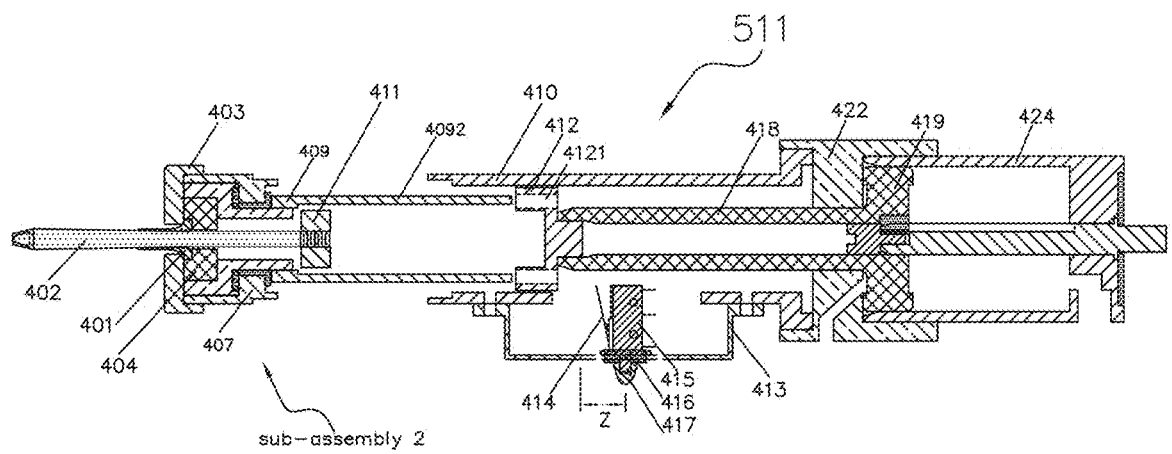
Figure 13:
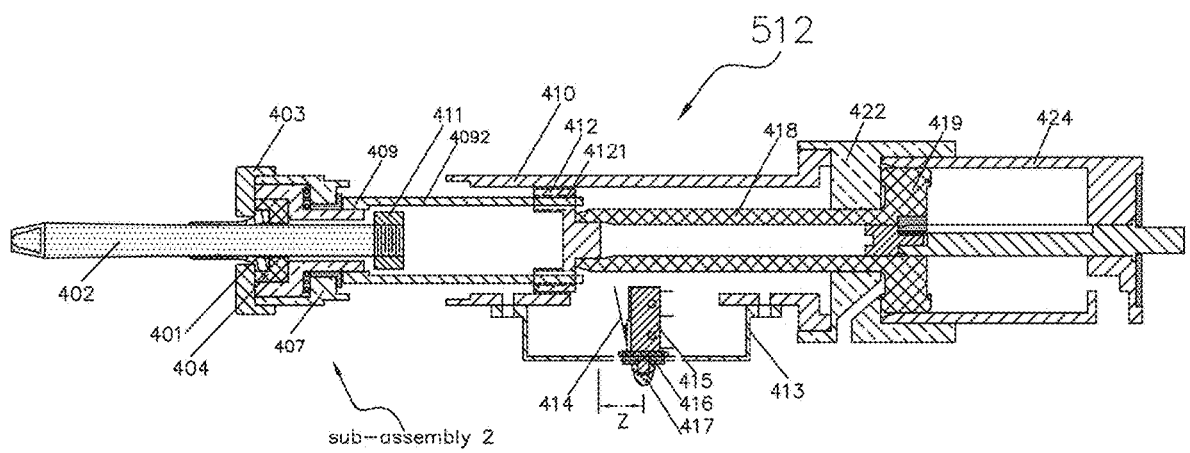

Step 6 is to coldwork holes of a different size which requires different size of sleeve retainer, sleeve, sleeve adaptor, mandrel and mandrel bushing, referring to FIGS. 12 and 13:

Step 6a) 509 make sure piston 419 is at the position of the extreme forward end of cylinder 424 with piston bottom out.

Step 6b) 510 unscrew mandrel 402 together with mandrel bushing 411 out of mandrel adaptor 412 and leave it within the rear extension tube 410 for the moment.

Step 6c) 511 remove sub-assembly 2 (also shown in 501) out of rear extension tube 410 by turning the screw-thread at the rear end of forward extension tube 4071.

Step 6d) 512 replace sleeve retainer 403, sleeve 401, sleeve adaptor 404, mandrel 402, and mandrel bushing 411 in sub-assembly 2 with those for the workpiece hole of a different size.

Step 6e) place sub-assembly 2 partially inside the rear extension tube 410 and pass the tang 4092 of the sleeve seat spindle 409 through the aperture 4121 of the mandrel adaptor 412, at this moment the configuration of the apparatus is the same as the one of Step 1d) 502, thereafter follow Step 1e) through Step 5 to coldwork holes of same different sizes.

Figure 14:
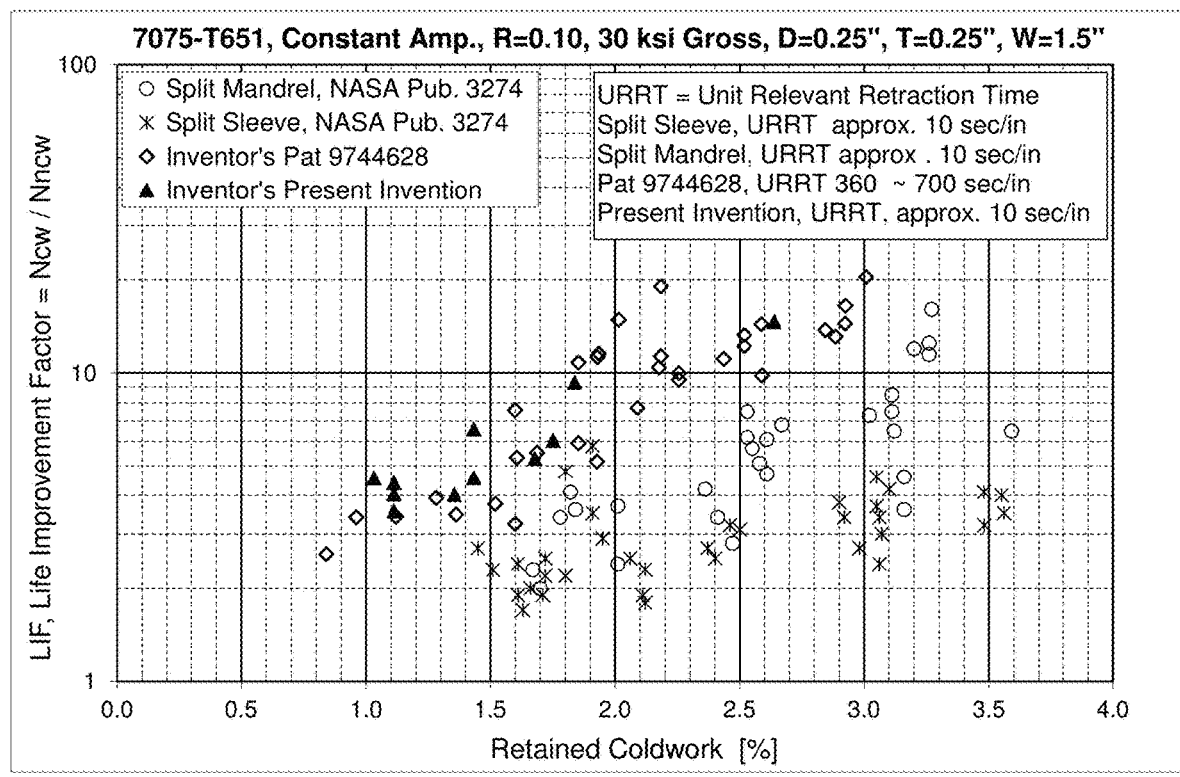
FIG. 14 shows the LIF vs RCW of hole-coldworking from FIG. 1 along with data for the present invention.

Using test parameters that are the same as those given in the NASA publication referred to above with reference to FIG. 1, coupon specimen test was performed to evaluate the effectiveness in the improvements over the prior known methods, and the test results are shown in FIG. 14. As indicated in FIG. 14, the test results for the apparatus of the present invention are within and at the upper edge of the scatter band of the '628 Patent; and the scatter band of the present invention is slightly narrower. In the '628 Patent, the mandrel retraction speed represented by URRT is 360~700 second per inch, where URRT is Unit Relevant Retraction Time; this means that a 0.25 inch thick hole will required 90~175 seconds to retract a mandrel from the moment mandrel engaging with hole bore to the moment mandrel disengaging with hole bore. The variation of 90~175 seconds depends on the RCW; higher RCW needs longer time to retract the mandrel. However, split sleeve and split mandrel method need an URRT of about 10 second per inch; this means that it takes only 2.5 seconds to retract the mandrel and is much faster than the prior invention. Accordingly, the present invention eliminates the disadvantage of the longer mandrel retraction time while improving the effectiveness of the coldworking operation.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An apparatus for coldworking material around a hole in a workpiece, wherein the hole has a hole diameter, comprising:
    a seamless sleeve comprising a tubular section and a first interlocking portion, wherein the tubular section extends from a proximal tube end to a distal tube end and comprises an outer cylindrical sidewall and an inner frustoconical sidewall, wherein the proximal tube end has a greater thickness than the distal tube end, wherein the inner frustoconical sidewall has a minimum inner sidewall diameter at the proximal sleeve end and a maximum inner sidewall diameter at the distal sleeve end, and wherein a portion of the outer cylindrical sidewall is positioned within the hole;
    a mandrel assembly comprising a mandrel and a mandrel adaptor, wherein the mandrel is comprised of a working section extending from a fixed rear end of the mandrel, wherein a frustoconical exterior surface of the working section extends between a distal working end and a proximal working end at a taper angle complementary to the inner frustoconical sidewall of the seamless sleeve, wherein the seamless sleeve surrounds a portion of the working section of the mandrel, wherein the proximal working end has a minimum mandrel diameter less than the minimum inner sidewall diameter of the seamless sleeve, wherein the distal working end has a maximum mandrel diameter less than the hole diameter and greater than the maximum inner sidewall diameter of the seamless sleeve, wherein the mandrel axially moves relative to the seamless sleeve between an extended position, a partially retracted position, and a fully retracted position, wherein the distal working end is inserted through the hole in the extended position before the outer cylindrical sidewall of the seamless sleeve is positioned within the hole, wherein the exterior surface of the mandrel's working section initially engages the inner frustoconical sidewall of the seamless sleeve in the partially retracted position and the distal working end is closer to the hole in the partially retracted position relative to the extended position, and wherein the distal working end is closest to the hole in the fully retracted position and the exterior surface of the mandrel's working section radially expands the inner frustoconical sidewall and the outer cylindrical sidewall of the seamless sleeve, thereby radially expanding the hole;
    a spindle assembly comprising an axially fixed section and a translating section, wherein the axially fixed section rotates around a central longitudinal axis, wherein the translating section is operatively connected to and rotates with the axially fixed section, wherein the translating section slides axially relative to the axially fixed section, and wherein the mandrel assembly is fixedly connected to and slides axially with and rotates with the translating section; and
    a sleeve seat assembly comprising a sleeve seat and a second interlocking portion, wherein the mandrel adaptor slidingly engages with and rotates the sleeve seat with the spindle assembly, wherein the sleeve seat engages with and rotates the second interlocking portion while rotating with the mandrel adaptor, and wherein the second interlocking portion engages the first interlocking portion of the seamless sleeve and rotates the seamless sleeve with the mandrel adaptor.

2. The apparatus of claim 1, wherein the seamless sleeve is comprised of a shape memory alloy with a superelasticity property, wherein the first interlocking portion of the seamless sleeve is comprised of a flange with a plurality of notches at a periphery of the flange, wherein the flange is attached to the tubular section at the proximal tube end, wherein the second interlocking portion is comprised of a sleeve adaptor connected to the sleeve seat, wherein the flange of the seamless sleeve is at least partially contained in a recess in the sleeve adaptor, and wherein the sleeve adaptor is further comprised of a plurality of tabs extending inwardly from an interior surface of the recess into the notches of the flange.

3. The apparatus of claim 2, wherein the sleeve seat further comprises a sleeve seat spindle with a plurality of tangs extending away from the seamless sleeve and towards the spindle assembly, wherein the mandrel adaptor is further comprised of a plurality of apertures slidingly receiving the tangs of the sleeve seat spindle, wherein the mandrel assembly further comprises a mandrel bushing fixedly connected to the mandrel adaptor, wherein the mandrel bushing comprises a threaded bore, and wherein the fixed rear end of the mandrel further comprises threads screwed into the threaded bore.

4. The apparatus of claim 1, further comprising a motor with a power switch and an actuator with a control switch, wherein the motor engages with and rotates the axially fixed section of the spindle assembly when the power switch is activated, wherein the actuator engages the translating section of the spindle assembly, wherein the actuator is operatively controlled to axially extend the translating section of the spindle assembly with the mandrel assembly when the control switch is set to an extension setting, and wherein the actuator is operatively controlled to axially retract the translating section of the spindle assembly with the mandrel assembly when the control switch is set to a retraction setting.

5. The apparatus of claim 4, wherein the actuator is a hydraulic actuator comprising a hydraulic cylinder and a cylinder head, wherein the axially fixed section of the spindle assembly is comprised of a piston spindle, wherein a rear end of the piston spindle engages the motor, wherein the translating section of the spindle assembly is comprised of a piston and a piston rod, wherein an inner channel extends through the piston and the piston rod, wherein a front end of the piston spindle extends into the inner channel, wherein the piston divides the hydraulic cylinder into an extension chamber between the piston and a rear end of the hydraulic cylinder and a retraction chamber between the piston and the cylinder head; wherein the piston translates on the piston spindle between the rear end of the chamber and the cylinder head, and wherein the piston rod extends through the cylinder head to a distal rod end fixedly connected to the mandrel assembly.

6. The apparatus of claim 5, wherein the spindle assembly further comprises a seal plug and a sliding key, wherein the piston rod is further comprised of a tube wherein the piston is further comprised of a key slot, wherein the piston spindle is further comprised of a groove aligned with the key slot in the piston and a cavity at the front end, wherein the cavity holds the seal plug within the inner channel of the piston rod at a location between the distal rod end and the key slot, and wherein the key is held in the key slot and slides in the groove as the piston and piston rod axially translate on the piston spindle.

7. The apparatus of claim 5, further comprising an extension tube assembly, a thrust bearing, a sleeve bearing, and a sleeve retainer, wherein the extension tube assembly is fixedly connected to the motor and the actuator and surrounds the first interlocking portion of the seamless sleeve, the sleeve seat assembly, the mandrel adaptor, and the fixed rear end of the mandrel, wherein the sleeve retainer is fixedly connected to a forward end of the extension tube assembly, wherein the first interlocking portion of the seamless sleeve is positioned between the sleeve retainer and the sleeve seat, and wherein the thrust bearing and the sleeve bearing are held between the sleeve seat and the extension tube assembly.

8. The apparatus of claim 4, further comprising a retraction control assembly operatively engaged with the mandrel assembly and the control switch, wherein the retraction control assembly is set to a retraction distance for the mandrel from the extended position to the fully retracted position, wherein the mandrel is disengaged from the seamless sleeve in the extended position, and wherein the retraction control assembly stops the control switch from operating the actuator and prevents further retraction of the spindle assembly and the mandrel assembly beyond the fully retracted position.

9. The apparatus of claim 8, wherein the retraction control assembly is one of a mechanical stop switch and an electronic controller.

10. The apparatus of claim 8, wherein the retraction control assembly is comprised of a mechanical stop switch in series connection with the control switch for the actuator, wherein the mechanical stop switch spaced a distance back from a rear face of the mandrel adaptor when the mandrel is in the extended position and is biased to be in a closed circuit with the control switch, wherein the rear face of mandrel adaptor engages the mechanical stop switch and forces an open circuit in the mechanical stop switch to stop the mandrel in the fully retracted position.

11. An apparatus for coldworking material around a hole in a workpiece, wherein the hole has a hole diameter, comprising:
    a sleeve comprising a tubular section and a first interlocking portion, wherein the tubular section extends from a proximal tube end to a distal tube end and comprises an outer cylindrical sidewall and an inner frustoconical sidewall, wherein the proximal tube end has a greater thickness than the distal tube end, wherein the inner frustoconical sidewall has a minimum inner sidewall diameter at the proximal sleeve end and a maximum inner sidewall diameter at the distal sleeve end, and wherein the outer cylindrical sidewall is positioned within the hole;
    a mandrel assembly comprising a mandrel and a mandrel adaptor, wherein the mandrel is comprised of a working section extending from a fixed rear end of the mandrel, wherein a frustoconical exterior surface of the working section extends between a distal working end and a proximal working end at a taper angle complementary to the inner frustoconical sidewall of the sleeve, wherein the proximal working end has a minimum mandrel diameter less than the minimum inner sidewall diameter of the sleeve, wherein the distal working end has a maximum mandrel diameter less than the hole diameter and greater than the maximum inner sidewall diameter of the sleeve, and wherein the sleeve surrounds a portion of the working section of the mandrel;
    a spindle assembly comprising an axially fixed section and a translating section, wherein the axially fixed section rotates around a central longitudinal axis, wherein the translating section is operatively connected to and rotates with the axially fixed section, wherein the translating section slides axially relative to the axially fixed section, and wherein the mandrel assembly is fixedly connected to and slides axially with and rotates with the translating section;
    a sleeve seat assembly comprising a sleeve seat and a second interlocking portion, wherein the mandrel adaptor slidingly engages with and rotates the sleeve seat with the spindle assembly, wherein the sleeve seat engages with and rotates the second interlocking portion while rotating with the mandrel adaptor, and wherein the second interlocking portion engages the first interlocking portion of the sleeve and rotates the sleeve with the mandrel adaptor;
    a motor in operative engagement with the axially fixed section of the spindle assembly and rotates the spindle assembly, wherein the spindle assembly rotates the mandrel assembly, and wherein the mandrel assembly rotates the sleeve seat assembly and the sleeve; and an actuator in operative engagement with the translating section of the spindle assembly, wherein the actuator axially extends and axially retracts the translating section relative to fixed section, and wherein the mandrel assembly axially extends and axially retracts with the translating section.

12. The apparatus of claim 11, wherein the actuator is a hydraulic actuator comprising a hydraulic cylinder and a cylinder head, wherein the axially fixed section of the spindle assembly is comprised of a piston spindle, wherein a rear end of the piston spindle engages the motor, wherein the translating section of the spindle assembly is comprised of a piston and a piston rod, wherein an inner channel extends through the piston and the piston rod, wherein a front end of the piston spindle extends into the inner channel, wherein the piston divides the hydraulic cylinder into an extension chamber between the piston and a rear end of the hydraulic cylinder and a retraction chamber between the piston and the cylinder head; wherein the piston translates on the piston spindle between the rear end of the chamber and the cylinder head, and wherein the piston rod extends through the cylinder head to a distal rod end fixedly connected to the mandrel assembly.

13. The apparatus of claim 11, wherein the sleeve is a seamless sleeve comprised of a shape memory alloy with a superelasticity property, wherein the first interlocking portion of the seamless sleeve is comprised of a flange with a plurality of notches at a periphery of the flange, wherein the flange is attached to the tubular section at the proximal tube end, and wherein the second interlocking portion is comprised of a sleeve adaptor connected to the sleeve seat.

14. The apparatus of claim 13, wherein the actuator axially moves the mandrel relative to the seamless sleeve between an extended position, a partially retracted position, and a fully retracted position, wherein the distal working end is inserted through the hole in the extended position before the outer cylindrical sidewall of the seamless sleeve is positioned within the hole, wherein the exterior surface of the mandrel's working section initially engages the inner frustoconical sidewall of the seamless sleeve in the partially retracted position and the distal working end is closer to the hole in the partially retracted position relative to the extended position, and wherein the distal working end is closest to the hole in the fully retracted position and the exterior surface of the mandrel's working section radially expands the inner frustoconical sidewall and the outer cylindrical sidewall of the seamless sleeve.

15. The apparatus of claim 14, further comprising a retraction control assembly operatively engaged with the mandrel assembly and the actuator, wherein the retraction control assembly is set to a retraction distance for the mandrel from the extended position to the fully retracted position, wherein the mandrel is disengaged from the seamless sleeve in the extended position, and wherein the retraction control assembly stops the actuator and prevents further retraction of the spindle assembly and the mandrel assembly beyond the fully retracted position.

16. A method for coldworking material around a hole in a workpiece, wherein the hole has a hole diameter, the method comprising the steps of:
providing a seamless sleeve comprising a tubular section and a first interlocking portion, wherein the tubular section extends from a proximal tube end to a distal tube end and comprises an outer cylindrical sidewall and an inner frustoconical sidewall, wherein the proximal tube end has a greater thickness than the distal tube end, and wherein the inner frustoconical sidewall has a minimum inner sidewall diameter at the proximal sleeve end and a maximum inner sidewall diameter at the distal sleeve end;
providing a mandrel, wherein the mandrel is comprised of a working section extending from a fixed rear end of the mandrel, wherein a frustoconical exterior surface of the working section extends between a distal working end and a proximal working end at a taper angle complementary to the inner frustoconical sidewall of the sleeve, wherein the proximal working end has a minimum mandrel diameter less than the minimum inner sidewall diameter of the sleeve, and wherein the distal working end has a maximum mandrel diameter less than the hole diameter and greater than the maximum inner sidewall diameter of the sleeve;
placing the seamless sleeve around the working section of the mandrel;
inserting the distal working end of the mandrel through the hole in an extended position;
after the inserting step, positioning the outer cylindrical sidewall of the seamless sleeve within the hole;
retracting the mandrel from the extended position to partially retracted position and a fully retracted position while keeping the outer cylindrical sidewall of the seamless sleeve within the hole, wherein the exterior surface of the mandrel's working section initially engages the inner frustoconical sidewall of the seamless sleeve in the partially retracted position and the distal working end is closer to the hole in the partially retracted position relative to the extended position, and wherein the distal working end is closest to the hole in the fully retracted position and the exterior surface of the mandrel's working section radially expands the inner frustoconical sidewall and the outer cylindrical sidewall of the seamless sleeve between the partially retracted position and the fully retracted position;
extending the mandrel from the retracted position to at least one of the extended position and an intermediate extended position between the partially retracted position and the extended position;
rotating the sleeve and the mandrel after the extending step, wherein a connection between the mandrel and the sleeve causes the sleeve to rotate with the mandrel, and wherein the connection allows the mandrel to translate relative to the sleeve; and
removing the seamless sleeve and the mandrel from the hole.

17. The method claim 16, further comprising the steps of:
providing an actuator to perform the retracting step and the extending step, wherein the actuator is comprised of a retraction control device; and
providing a motor to perform the rotating step.

18. The method claim 17, further comprising the steps of:
setting a retraction distance for the retraction control device; and
automatically stopping the retracting step when the reaction control device reaches the retraction distance, wherein the retraction distance corresponds with the fully retracted position.

19. The method claim 17, wherein the motor engages the mandrel through a spindle assembly comprising an axially fixed section and a translating section, wherein the axially fixed section connects directly to the motor, wherein the translating section is operatively connected between the axially fixed section and the mandrel and slides axially relative to the axially fixed section, wherein actuator extends and retracts the translating section and the mandrel connected to the translating section, wherein the connection between the mandrel and the sleeve is further comprised of a sleeve seat spindle and a mandrel adaptor, wherein the sleeve seat spindle is rotationally engaged with the mandrel adaptor, and wherein the having mandrel adaptor translates relative to the sleeve seat spindle.

20. The method claim 19, wherein the actuator is a hydraulic actuator, and wherein the positioning step is further comprised of rotating the seamless sleeve while inserting the outer cylindrical sidewall of the seamless sleeve into the hole.

* * * * *